(12) United States Patent
Olszak

(10) Patent No.: US 11,857,927 B2
(45) Date of Patent: Jan. 2, 2024

(54) REVERSE OSMOSIS FILTER RAM APPARATUS, SYSTEMS, AND METHODS OF USING THE SAME

(71) Applicant: Complete Water Solutions, LLC, Twin Lakes, WI (US)

(72) Inventor: Nathan Olszak, Twin Lakes, WI (US)

(73) Assignee: Complete Water Solutions, LLC, Twin Lakes, WI (US)

( * ) Notice: Subject to any disclaimer, the term of this patent is extended or adjusted under 35 U.S.C. 154(b) by 171 days.

(21) Appl. No.: 17/518,051

(22) Filed: Nov. 3, 2021

(65) Prior Publication Data

US 2023/0138332 A1 May 4, 2023

(51) Int. Cl.
*B01D 61/02* (2006.01)
*B01D 61/08* (2006.01)

(52) U.S. Cl.
CPC ........... *B01D 61/025* (2013.01); *B01D 61/08* (2013.01); *B01D 2201/0415* (2013.01); *B01D 2201/282* (2013.01)

(58) Field of Classification Search
CPC .................. B01D 61/025; B01D 61/08; B01D 2201/0415; B01D 2201/282; B01D 2313/02; B01D 2313/06; B01D 61/10; C02F 1/441; C02F 2303/14
See application file for complete search history.

(56) References Cited

U.S. PATENT DOCUMENTS

| 4,711,128 A | 12/1987 | Boura |
| 2008/0308594 A1 | 12/2008 | Hallan et al. |
| 2020/0130017 A1 | 4/2020 | Trifol et al. |

FOREIGN PATENT DOCUMENTS

| CN | 211414992 | 9/2020 |
| CN | 112093854 | 12/2020 |
| JP | 2012005795 | 3/2012 |
| JP | 2012055795 | 3/2012 |
| JP | 5704538 | 3/2015 |
| JP | 5907385 | 4/2016 |
| WO | 2008036898 | 3/2008 |

*Primary Examiner* — Pranav N Patel
(74) *Attorney, Agent, or Firm* — Scherrer Patent & Trademark Law, P.C.; Stephen T. Scherrer; Monique A. Momeault

(57) ABSTRACT

A reverse osmosis filter ram apparatus comprises a base rack having a controllable linear actuator thereon, preferably a hydraulic ram apparatus. The ram apparatus comprises detachable and changeable connection brackets configured to alternately connect to steel reverse osmosis tubes and fiberglass reverse osmosis tubes. The linear actuator comprises a plunger head that is configured to push one or more spools within a reverse osmosis tube for moving tubular reverse osmosis filters therein, either for adding the same from the reverse osmosis tube or removal of the same from the reverse osmosis tube. Systems and methods of using the same are further provided.

20 Claims, 9 Drawing Sheets

REVERSE OSMOSIS FILTER RAM APPARATUS, SYSTEMS, AND METHODS OF USING THE SAME

TECHNICAL FIELD

The present invention relates to a reverse osmosis filter ram apparatus. Specifically, the present invention comprises a base rack having a controllable linear actuator thereon, preferably a hydraulic ram apparatus. The ram apparatus comprises detachable and changeable connection brackets configured to alternately connect to steel reverse osmosis tubes and fiberglass reverse osmosis tubes. The linear actuator comprises a plunger head that is configured to push one or more spools within a reverse osmosis tube for moving tubular reverse osmosis filters therein, either for adding the same to the reverse osmosis tube or removal of the same from the reverse osmosis tube. Systems and methods of using the same are further provided.

BACKGROUND

Reverse osmosis systems generally remove pollutants and other like molecules from water. In a typical industrial reverse osmosis system, a series of tubes, each having a plurality of tubular reverse osmosis filters, have wastewater pumped therein at high pressure. As the water passes through the reverse osmosis filters, larger molecules and compounds, such as waste products, salts, contagions such as viruses, bacteria, fungi, and other like contagions, are filter and a clean water stream is collected. The clean water stream is utilized or further filtered for increased purity. The contaminants are typically collected for further processing/filtering or collected for disposal.

Each of the reverse osmosis filters is tubular, having a filter medium in a rolled configuration. The filter media comprises a plurality of layers. Contaminated water is pumped at high pressure longitudinally through the rolled filter media, and a barrier layer passes water molecules therethrough but not larger molecules, as detailed above. The water molecules then pass through a filter passage spirally through the rolled filter media to an axial passage where it is removed from the reverse osmosis tube and collected for use or further processing.

Each reverse osmosis tube comprises a plurality of reverse osmosis filters disposed serially and connected together axially to allow passage of clean water through the reverse osmosis tube. Typically, reverse osmosis filters are pulled or pushed from the reverse osmosis tubes. It is common to use a hook on a reverse osmosis tube to pull the same from a reverse osmosis tube.

Reverse osmosis filters must be changed periodically as the filter media collects impurities. However, it is often difficult to remove reverse osmosis filters from reverse osmosis tubes. Because there is a plurality of filters disposed serially within each reverse osmosis tube, it may be difficult to reach reverse osmosis tubes that are within the tubes. Moreover, over time, sediments and impurities can collect around the edges of the filters, causing the filters to jam within the tubes, thereby preventing the removal of the same. Oftentimes, it is typical to take a pole or a board, place the same within the reverse osmosis tube and hit it with a hammer in an attempt to dislodge the same from the tube. However, this technique can lead to damage of the equipment, namely of the tubes themselves, the filters disposed therein, or other ancillary equipment.

A need, therefore, exists for an improved apparatus for removing reverse osmosis filters from a reverse osmosis tube. Specifically, a need exists for an improved apparatus for moving reverse osmosis filters through a reverse osmosis tube that prevents damage to the tubes, the filters, and to other ancillary equipment.

Moreover, placement of reverse osmosis filters within reverse osmosis tubes may also present challenges. Specifically, because a plurality of reverse osmosis filters is disposed and connected serially within each reverse osmosis tube, it may be difficult to add reverse osmosis filters to the reverse osmosis tubes and place them in their desired locations. As more and more filters are added to a reverse osmosis tube, it may become more difficult to keep pushing the series of filters through the reverse osmosis tube, due to compounded friction of the filters within the pipes.

A need, therefore, exists for an improved apparatus for adding filters to reverse osmosis tubes. Specifically, a need exists for an improved apparatus that can easily and effectively move a plurality of serially connected filters through the reverse osmosis pipe, without having problems with compounded friction or the like.

Current methods of removing and/or adding reverse osmosis filters to reverse osmosis tubes provide no alignment of the tools to prevent the tools from striking or hitting the sides of the tubes, pipes running therethrough, or other like elements within a reverse osmosis tube. Therefore, present tools can impinge on these elements causing damage to the same.

A need, therefore, exists for an improved apparatus for adding filters to and/or removing filters from reverse osmosis tubes that is properly aligned. Specifically, a need exists for an improved apparatus that pushes filters therethrough without impinging or contacting sensitive elements within the reverse osmosis tube.

SUMMARY OF THE INVENTION

The present invention relates to a reverse osmosis filter ram apparatus. Specifically, the present invention comprises a base rack having a controllable linear actuator thereon, preferably a hydraulic ram apparatus. The ram apparatus comprises detachable and changeable connection brackets configured to alternately connect to steel reverse osmosis tubes and fiberglass reverse osmosis tubes. The linear actuator comprises a plunger head that is configured to push one or more spools within a reverse osmosis tube for moving tubular reverse osmosis filters therein, either for adding the same to the reverse osmosis tube or removal of the same from the reverse osmosis tube. Systems and methods of using the same are further provided.

To this end, in an embodiment of the present invention, a filter ram system for use in pushing reverse osmosis filters through a reverse osmosis tube is provided. The filter ram system comprises: a filter ram apparatus comprising: a base configured to hold a plunger, the plunger comprising a plunger rod and a plunger head on an end of the plunger rod, the plunger controlled via a linear actuator to extend the plunger rod and head from the plunger; a controller for controlling the linear actuator to extend the plunger rod and plunger head from the plunger; and a clamp on an end of the base; and a fiberglass reverse osmosis tube attachment bracket comprising: a first ring configured to sit on an end of a fiberglass reverse osmosis tube, the first ring having a bracket tube extending therefrom, the bracket tube extending beyond the end of the fiberglass reverse osmosis tube when sitting thereon and having an internal diameter roughly the same as an internal diameter of the fiberglass reverse osmosis tube; a second ring configured to be attached around the fiberglass reverse osmosis tube behind a flare of the fiberglass reverse osmosis tube; a first tab extending from the first ring; a second tab extending from the second ring; a threaded rod between the first tab and the second tab and connecting the second ring to the first ring, wherein the clamp of the filter ram apparatus is configured to hold the base and the plunger of the filter ram apparatus onto the bracket tube of the bracket such that the plunger rod and plunger head are in alignment with an opening of the fiberglass reverse osmosis tube.

In an embodiment, the base comprises a plurality of base rods connected between a first end plate and a second end plate.

In an embodiment, the plurality of base rods is configured to form a base having a semi-cylindrical base area.

In an embodiment, the clamp comprises a first semi-circular ring element attached to the base and configured to engage a lower outside surface of the bracket tube.

In an embodiment, the clamp further comprises a second semi-circular ring element connected to the first semi-circular ring element and configured to engage an upper outside surface of the bracket tube.

In an embodiment, the second semi-circular ring element is attached to the first semi-circular ring element via at least one rod.

In an embodiment, the clamp further comprises a circular ring element connected to the first semi-circular ring element and configured to engage completely around a surface of bracket tube.

In an embodiment, the circular ring element is attached to the first semi-circular ring element via at least one rod.

In an embodiment, the plunger is rotatably connected to the base and comprises a first position and a second position, wherein the first position of the plunger is on or adjacent the base and the second position of the plunger is away from the base thereby forming an open space adjacent the space when the plunger is in the second position.

In an embodiment, the filter ram system further comprises: a pushing spool comprising a first disk end, a second disk end, and a rod disposed between the first disk end and the second disk end.

In an embodiment, the second ring of the bracket comprises a hinge for opening and closing the second ring on the fiberglass reverse osmosis tube.

In an embodiment, the filter ram system further comprises: a fiberglass reverse osmosis tube, wherein the bracket is attached to an open end of the fiberglass reverse osmosis tube.

In an alternate embodiment of the present invention, a method of pushing a reverse osmosis filter through a reverse osmosis tube is provided. The method comprises the steps of: providing the filter ram system; providing a fiberglass reverse osmosis tube; clamping the bracket to an open end of the reverse osmosis tube; clamping the reverse osmosis filter ram apparatus to the bracket tube; and pushing a reverse osmosis filter through the reverse osmosis tube with the filter ram apparatus.

In an embodiment, the clamp comprises a first semi-circular ring element attached to the base and engages a lower outside surface of the bracket tube.

In an embodiment, the clamp further comprises a second semi-circular ring element connected to the first semi-circular ring element and engages an upper outside surface of the bracket tube.

In an embodiment, the second semi-circular ring element is attached to the first semi-circular ring element via at least one rod.

In an embodiment, the clamp further comprises a circular ring element connected to the first semi-circular ring element and configured to engage completely around a surface of the reverse osmosis tube.

In an embodiment, the circular ring element is attached to the first semi-circular ring element via at least one rod.

In an embodiment, the plunger is rotatably connected to the base and comprises a first position and a second position, wherein the first position of the plunger is on or adjacent the base and the second position of the plunger is away from the base thereby forming an open space adjacent the space when the plunger is in the second position, and comprising the steps of: rotating the plunger from the first position to the second position; placing the reverse osmosis filter into the open end of the fiberglass reverse osmosis tube; rotating the plunger from the second position to the first position; and pushing the reverse osmosis filter through the fiberglass reverse osmosis tube by extending the plunger rod and plunger head into the fiberglass reverse osmosis tube.

In an embodiment, the plunger is rotatably connected to the base and comprises a first position and a second position, wherein the first position of the plunger is on or adjacent the base and the second position of the plunger is away from the base thereby forming an open space adjacent the space when the plunger is in the second position, and comprising the steps of: providing a pushing spool comprising a first disk end, a second disk end, and a rod disposed between the first disk end and the second disk end; rotating the plunger from the first position to the second position; pushing the spool into the fiberglass reverse osmosis tube by extending the plunger rod and plunger head into the fiberglass reverse osmosis tube.

It is, therefore, an advantage and objective of the present invention to provide an improved apparatus for removing reverse osmosis filters from a reverse osmosis tube.

Specifically, it is an advantage and objective of the present invention to provide an improved apparatus for moving reverse osmosis filters through a reverse osmosis tube that prevents damage to the tubes, the filters, and to other ancillary equipment.

Moreover, it is an advantage and objective of the present invention to provide an improved apparatus for adding filters to reverse osmosis tubes.

Specifically, it is an advantage and objective of the present invention to provide an improved apparatus that can easily and effectively move a plurality of serially connected filters through the reverse osmosis pipe, without having problems with compounded friction or the like.

Further, it is an advantage and objective of the present invention to provide an improved apparatus for adding filters to and/or removing filters from reverse osmosis tubes that is properly aligned.

Still further, it is an advantage and objective of the present invention to provide an improved apparatus that pushes filters therethrough without impinging or contacting sensitive elements within the reverse osmosis tube.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a reverse osmosis filter ram apparatus. Specifically, the present invention comprises a base rack having a controllable linear actuator thereon, preferably a hydraulic ram apparatus. The ram apparatus comprises detachable and changeable connection brackets configured to alternately connect to steel reverse osmosis tubes and fiberglass reverse osmosis tubes. The linear actuator comprises a plunger head that is configured to push one or more spools within a reverse osmosis tube for moving tubular reverse osmosis filters therein, either for adding the same to the reverse osmosis tube or removal of the same from the reverse osmosis tube. Systems and methods of using the same are further provided.

Figure 1:
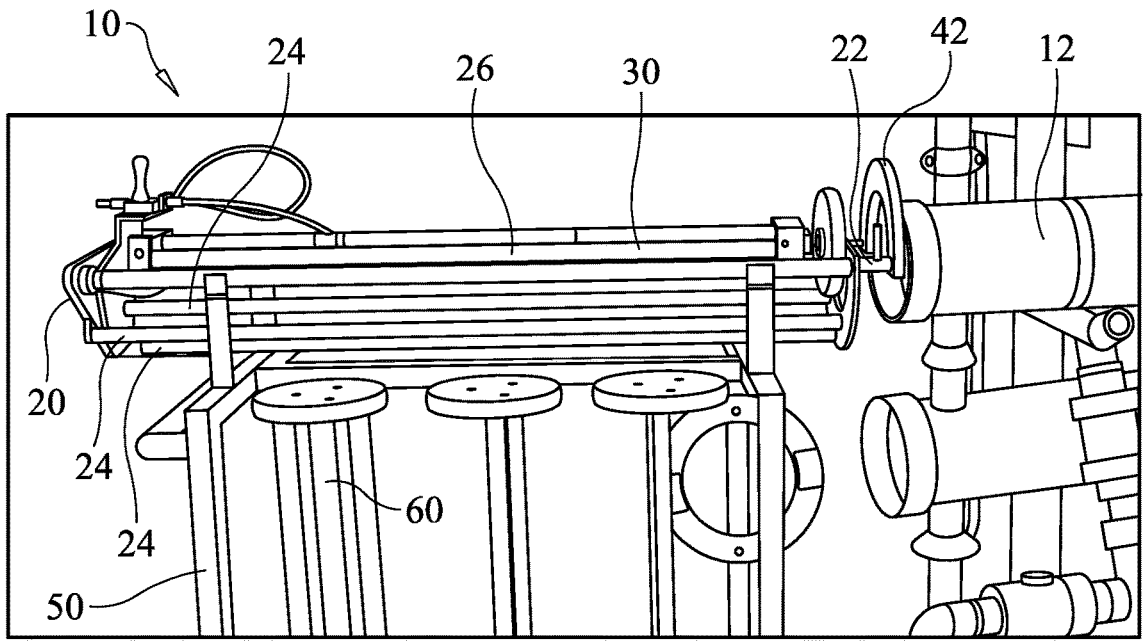
FIG. 1 illustrates a perspective view of a reverse osmosis filter ram apparatus on a storage and/or holding rack with a plurality of spools in an embodiment of the present invention.
Figure 16:
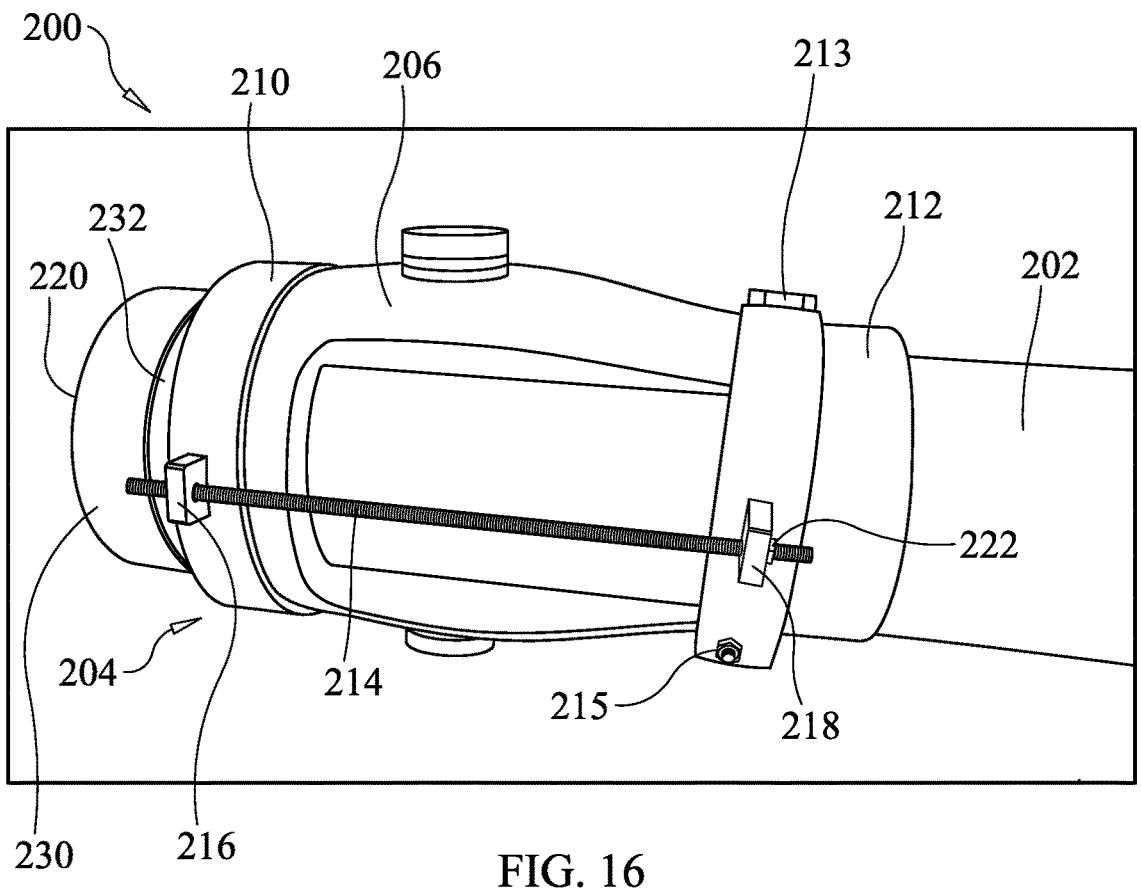
FIG. 16 illustrates a perspective view of a reverse osmosis filter ram apparatus bracket connected to a fiberglass reverse osmosis tube in yet another alternate embodiment of the present invention.
Figure 17:
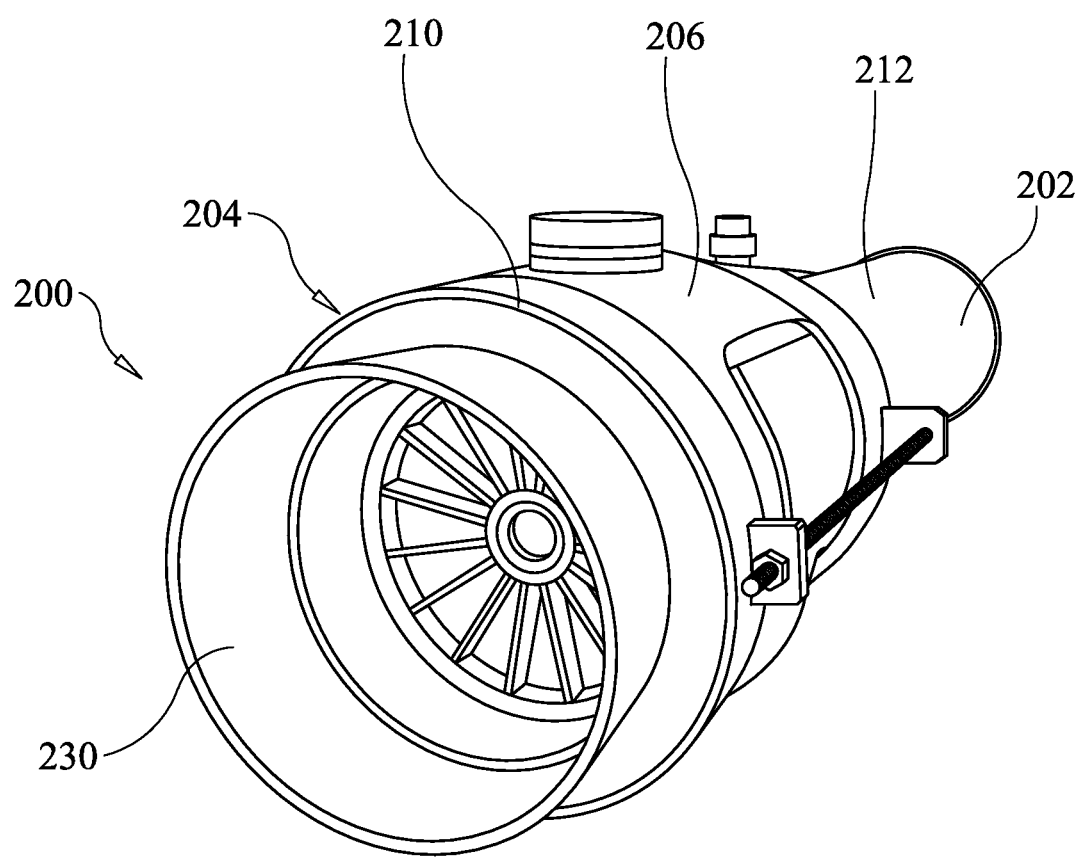
FIG. 17 illustrates a close-up side view of a reverse osmosis filter ram apparatus bracket connected to a fiberglass reverse osmosis tube in the yet another alternate embodiment of the present invention.

Now referring to the figures, wherein like numerals refer to like parts, FIG. 1 illustrates a reverse osmosis filter ram apparatus 10 in an embodiment of the present invention. The ram apparatus 10 is specifically designed for use in steel reverse osmosis tubes 12, as illustrated in FIGS. 1-13, or in fiberglass reverse osmosis tubes, as illustrated and describe with reference to FIGS. 16 and 17, below. The filter ram apparatus 10 comprises a first end plate 20 and a second end plate 22, with a plurality of base rods 24 disposed in a semi-circular arc around the first end plate 20 and the second end plate 22, thereby forming a base on which a plunger 26 may sit. The plunger comprises a plunger tube 30 which may contain a rod 32 (as illustrated in FIG. 13) and a plunger head 34 on an end of the rod 32. The plunger 26 may have a controller 36 that may control the linear actuation of the rod 32 and plunger 34 out of the plunger tube 30. The linear actuator may preferably be hydraulically controlled, such that activating the plunger 26 using the controller 36 causes the rod 32 and plunger head 34 to extend out of the tube 30.

The plunger head 34 may be in the shape of a disk and may be made from a thermoplastic material that may easily be pushed into the steel tube 12 to push one or more osmosis filters and/or pushing spools (as described below) in or out of the steel tube 12. It should also be noted that the plunger head 34 may also be utilized to push osmosis filters and/or pushing spools into and out of fiberglass reverse osmosis tubes, as described below with reference to FIGS. 14 and 15.

Figure 2:
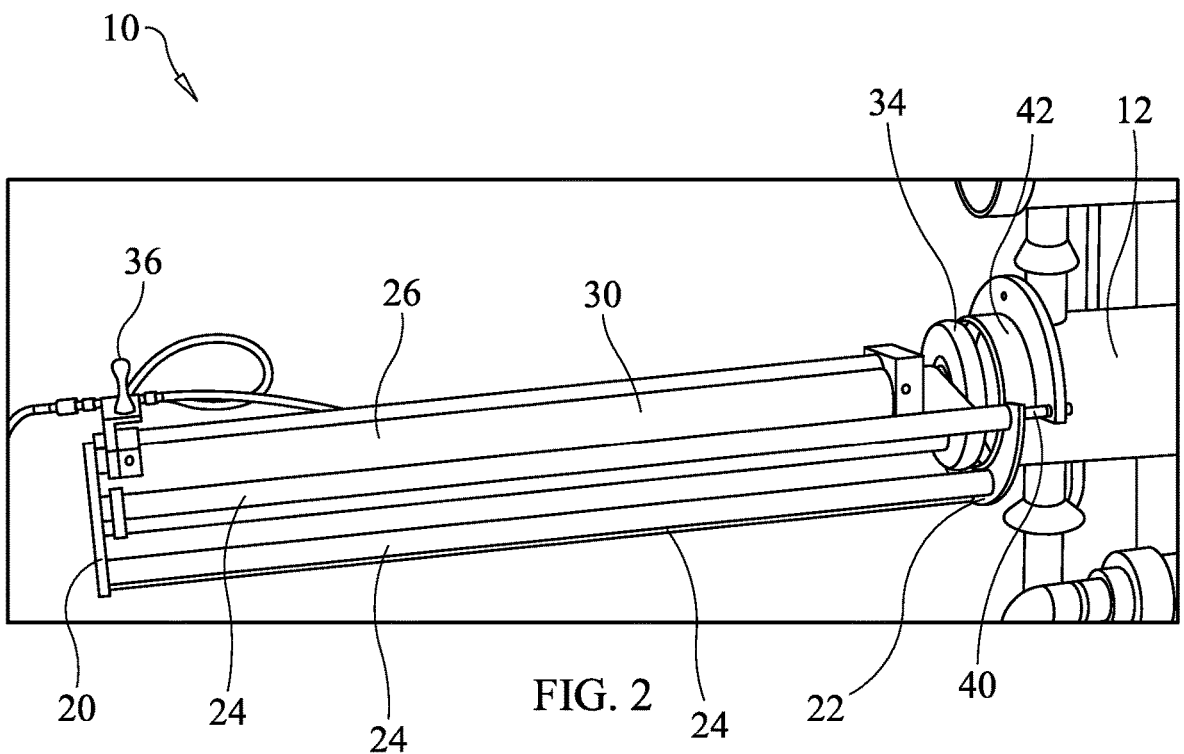
FIG. 2 illustrates a perspective view of a reverse osmosis filter ram apparatus connected to a steel reverse osmosis tube in an embodiment of the present invention.
Figure 3:
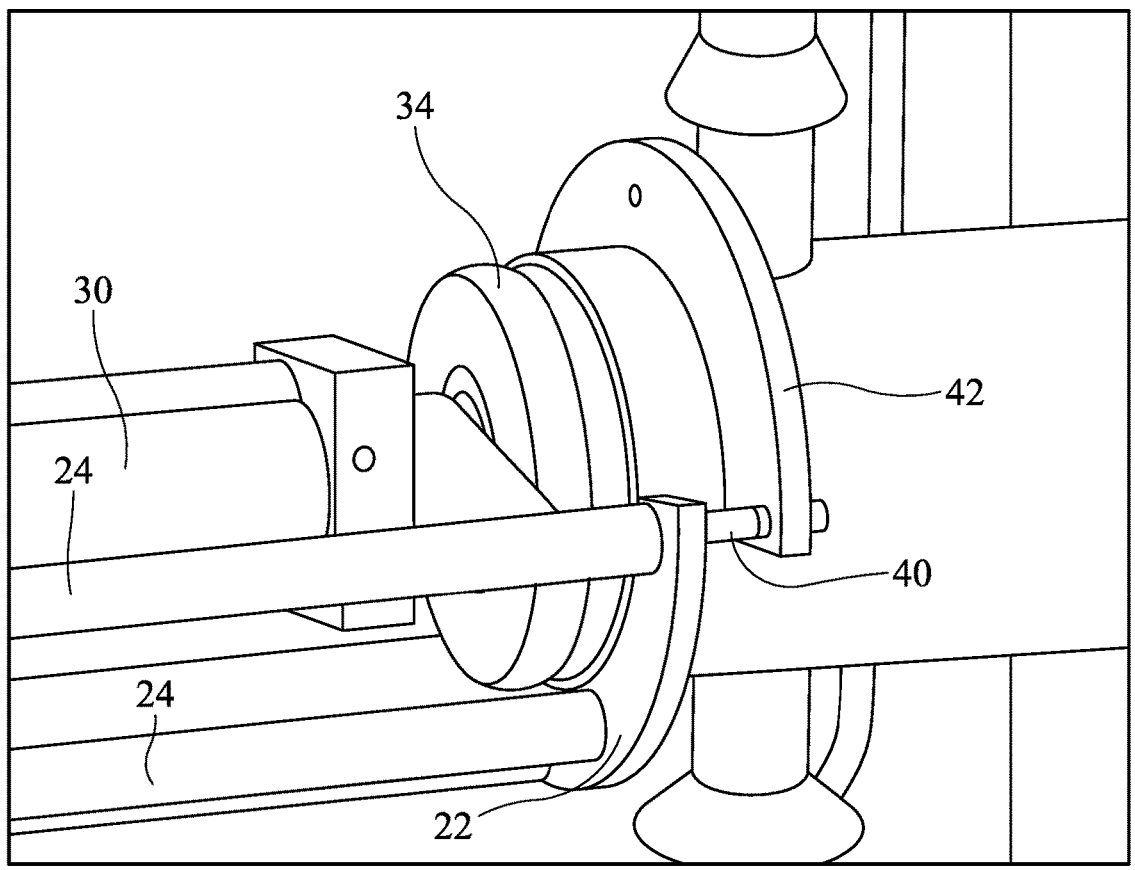
FIG. 3 illustrates a close-up perspective view of a reverse osmosis filter ram apparatus connected to a steel reverse osmosis tube in an embodiment of the present invention.

The second end plate 22 may be sized and positioned, as illustrated in FIGS. 2 and 3, to sit against the bottom outside circular wall of the steel tube 12. Extending from the second end plate 22 may be relatively short rods 40, which connect to a semi-circular clamp plate or ring 42 that may be sized and positioned, as illustrated in FIG. 2, to sit against the top outside circular wall of the steel tube 12. The second end plate 22 and the clamp plate or ring 42 may act together to clamp the filter ram apparatus 10 to the open end of the steel tube 12.

Therefore, the plunger head 34 may be pushed into the steel tube 12, thereby moving reverse osmosis filters or pushing spools through the steel tube 12. The second end plate 22 and the clamp plate or ring 42 may hold the filter ram apparatus 10 in place so that the plunger head 34 has a direct unimpeded path into the steel tube 12.

As shown in FIG. 1, the filter ram apparatus 10 may rest upon a cart 50 that may be movable and allow the filter ram apparatus 10 to be positioned adjacent to a reverse osmosis tube, as shown in FIG. 1. Once clamped to the tube 12, the cart may be moved out of the way, as shown in FIG. 2. The cart may further have a plurality of pushing spools 60 (described below) and may provide storage for other elements required, such as tools, alternate parts, or the like.

Figure 4:
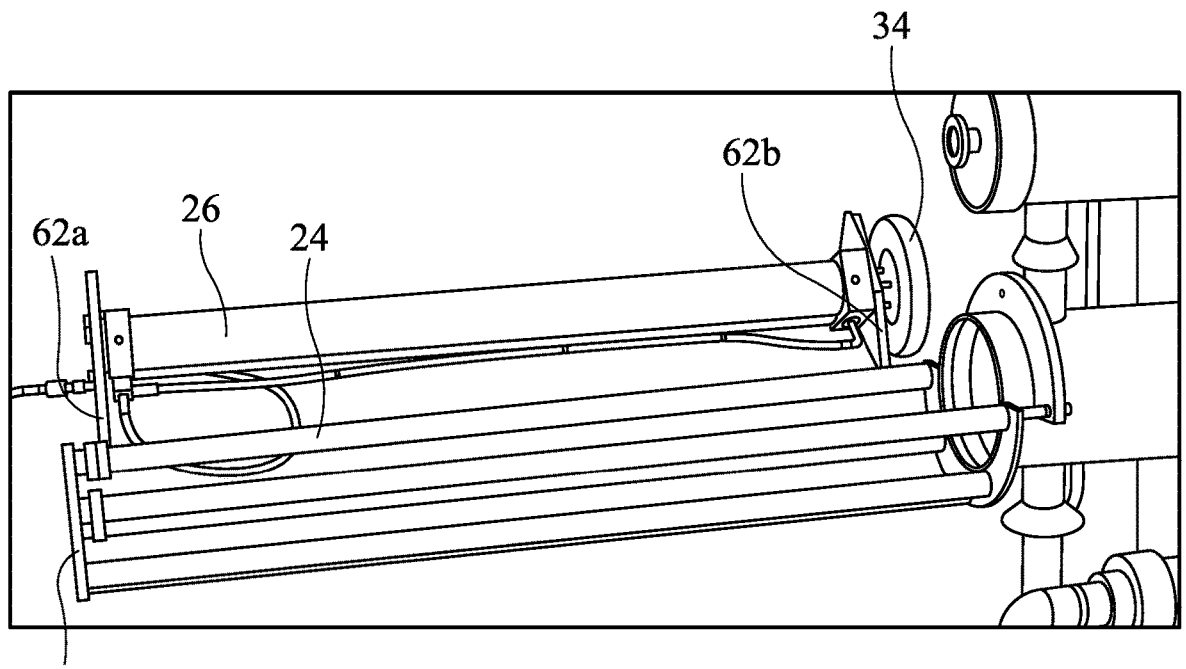
FIG. 4 illustrates a perspective view of a reverse osmosis filter ram apparatus connected to a steel reverse osmosis tube having the ram rotated away from a base in an embodiment of the present invention.

FIGS. 4-9 illustrate the use of the filter ram apparatus 10 to push a pushing spool into the steel tube 12. As shown in FIG. 4, the plunger tube, along with the rod 32 and the plunger head 34, may be rotatably attached via rotatable connectors 62a, 62b to one of the base rods 24 so that the plunger tube 30, the plunger rod 32 and the plunger head 34 may be moved off of the base formed by the base rods 24, thereby clearing the space for a pushing spool 60. The pushing spool 60 may comprise a pushing spool rod 64 having, on terminal ends thereof, first and second pushing spool heads 66, respectively. The pushing spool heads 66 may be disks that are sized and shaped to just fit within the opening of the steel tube 12, thereby moving into and through the steel tube 12.

Figure 5:
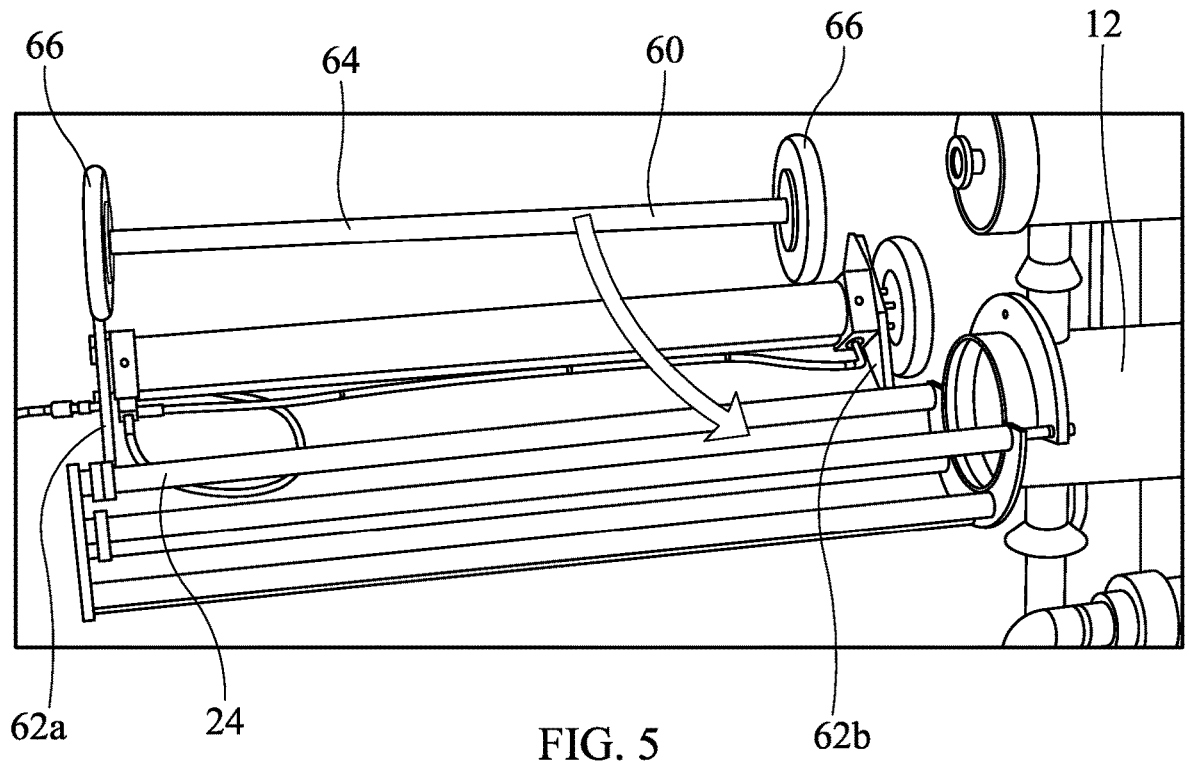
FIG. 5 illustrates a perspective view of a reverse osmosis filter ram apparatus and a pushing spool in an embodiment of the present invention.
Figure 6:
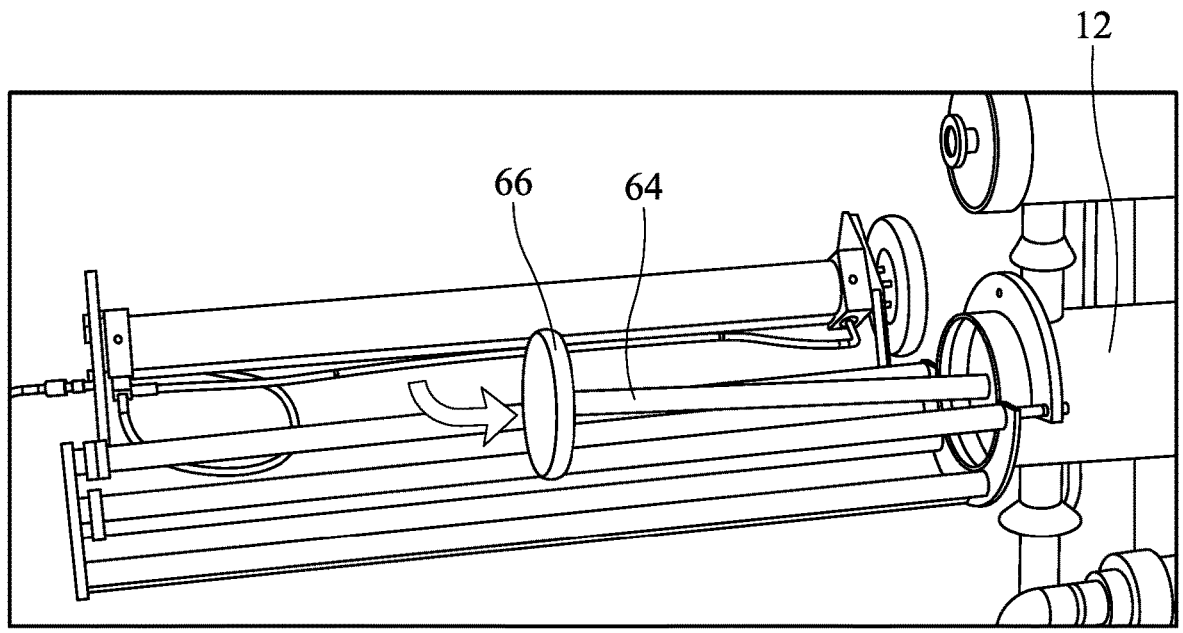
FIG. 6 illustrates a perspective view of a reverse osmosis filter ram apparatus and a pushing spool partially inserted into the steel reverse osmosis tube in an embodiment of the present invention.
Figure 7:
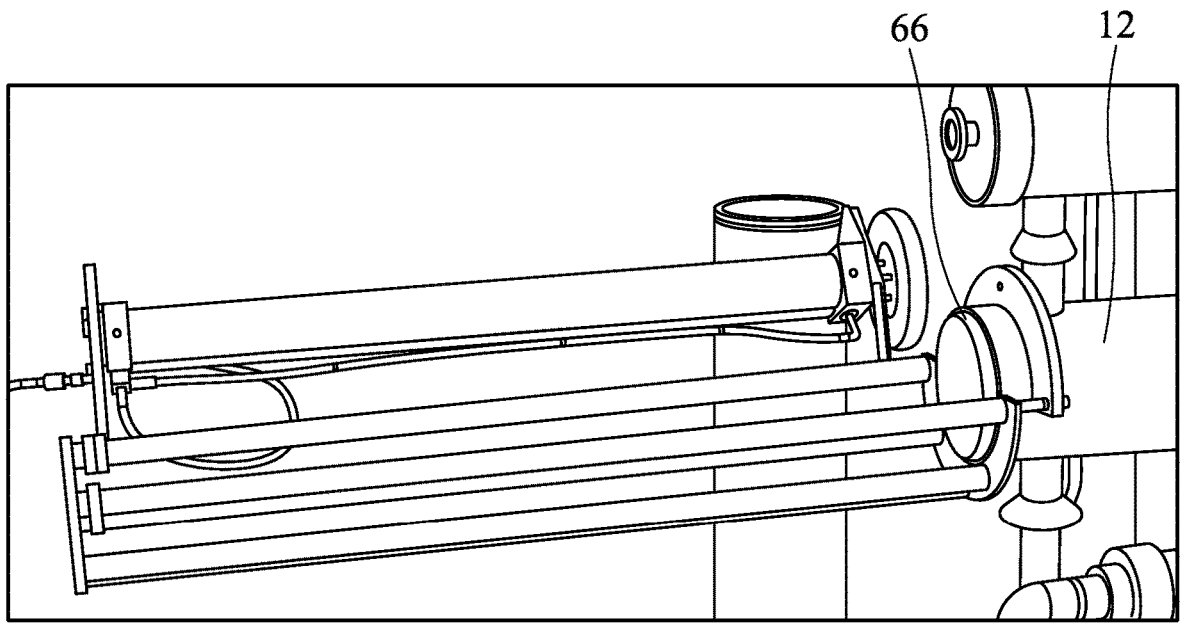
FIG. 7 illustrates a perspective view of a reverse osmosis filter ram apparatus and a pushing spool fully inserted into the steel reverse osmosis tube in an embodiment of the present invention.
Figure 8:
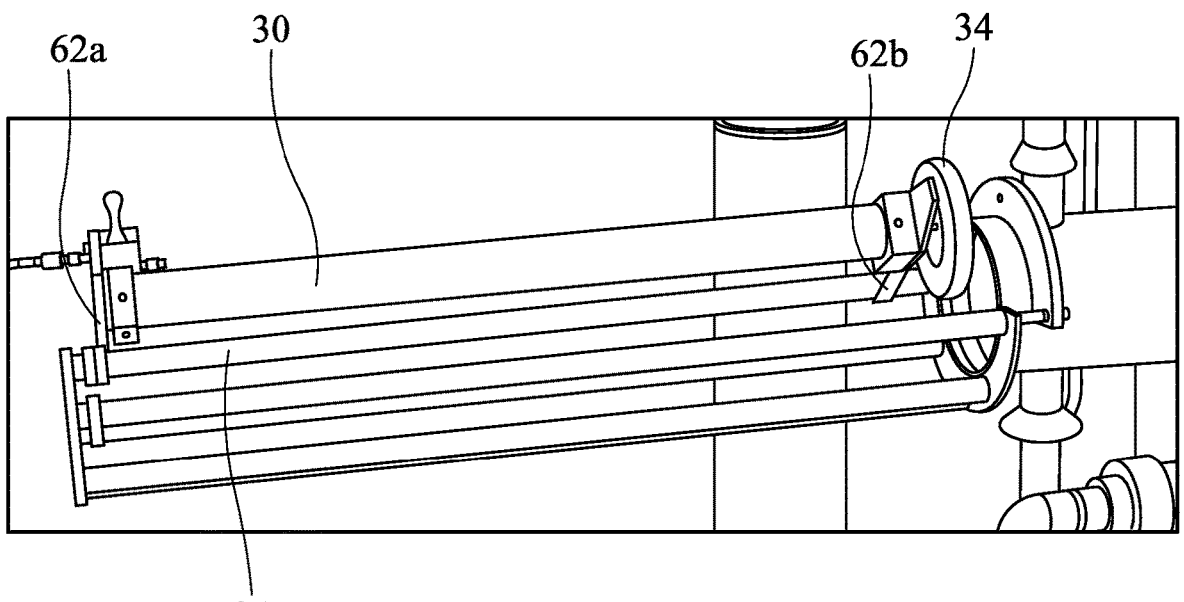
FIG. 8 illustrates a perspective view of a reverse osmosis filter ram apparatus having the ram rotated back into position over the base in an embodiment of the present invention.
Figure 9:
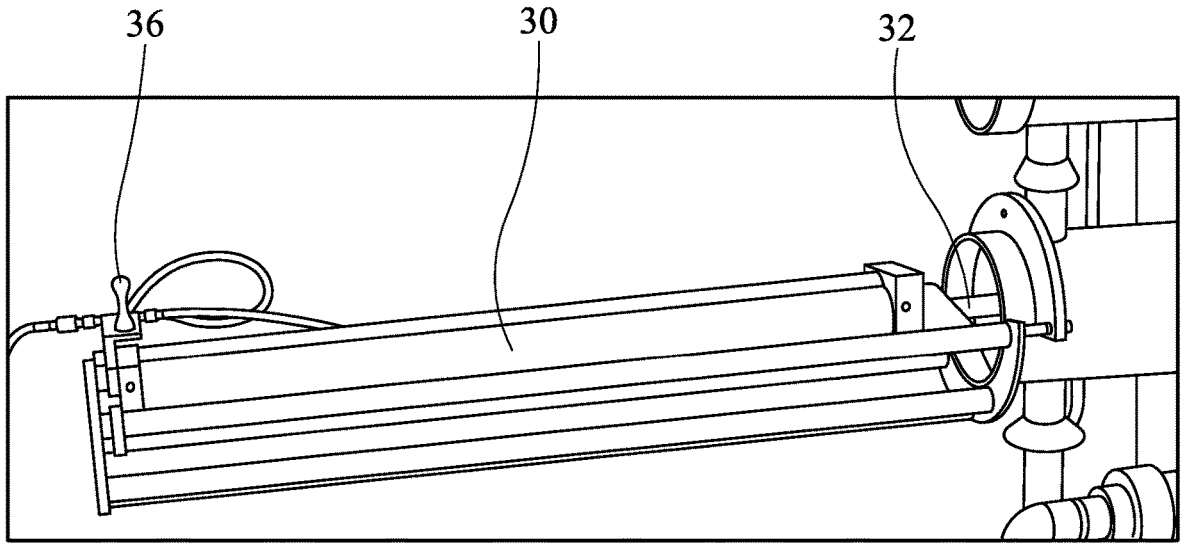
FIG. 9 illustrates a perspective view of a reverse osmosis filter ram apparatus wherein the ram is hydraulically extended into the steel reverse osmosis tube to push the pushing spool in an embodiment of the present invention.

As shown in FIGS. 5-7, pushing spool 60 may be placed into the steel tube 12 manually until the rear pushing spool head 66 is placed just inside the opening of the steel tube 12. As illustrated by FIG. 8, the plunger tube 30, with plunger rod 32 and plunger head 34, may be rotated back toward the base formed by the base rods 24 so that the plunger head 34 and plunger rod 32 are aligned with the opening of the steel tube 12. A user may then operate the controller 36 to push the plunger head 34 and thus the pushing spool 60 into steel tube 12. A plurality of pushing spools 60 may therefore be pushed into the steel tube 12 in the same manner to dislodge and move spent reverse osmosis filters through and out of the steel tube 12 on an opposite side thereof, which would also be opened. Once all of the spent reverse osmosis filters are removed from the steel tube 12, a plurality of clean reverse osmosis filters may be pushed into the steel tube 12, as described below with reference to FIGS. 9-13.

Figure 10:
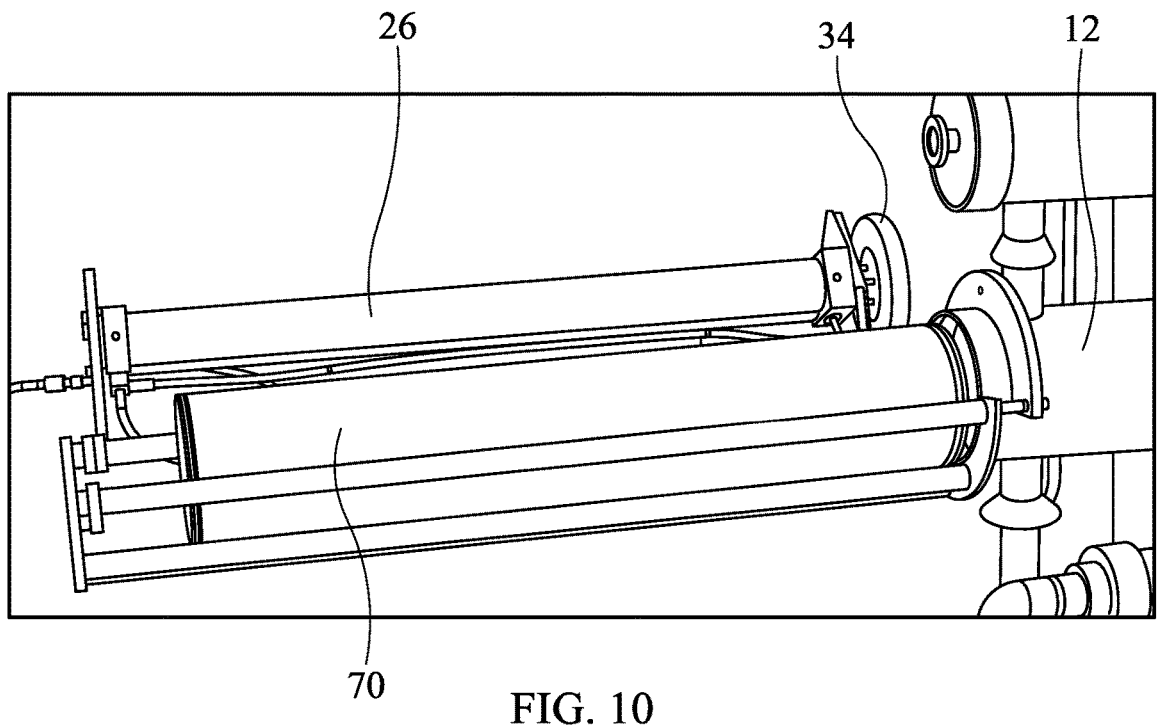
FIG. 10 illustrates a perspective view of a reverse osmosis filter ram apparatus rotated away from the base and having a reverse osmosis filter placed on the base for insertion in the steel reverse osmosis tube in an embodiment of the present invention.
Figure 11:
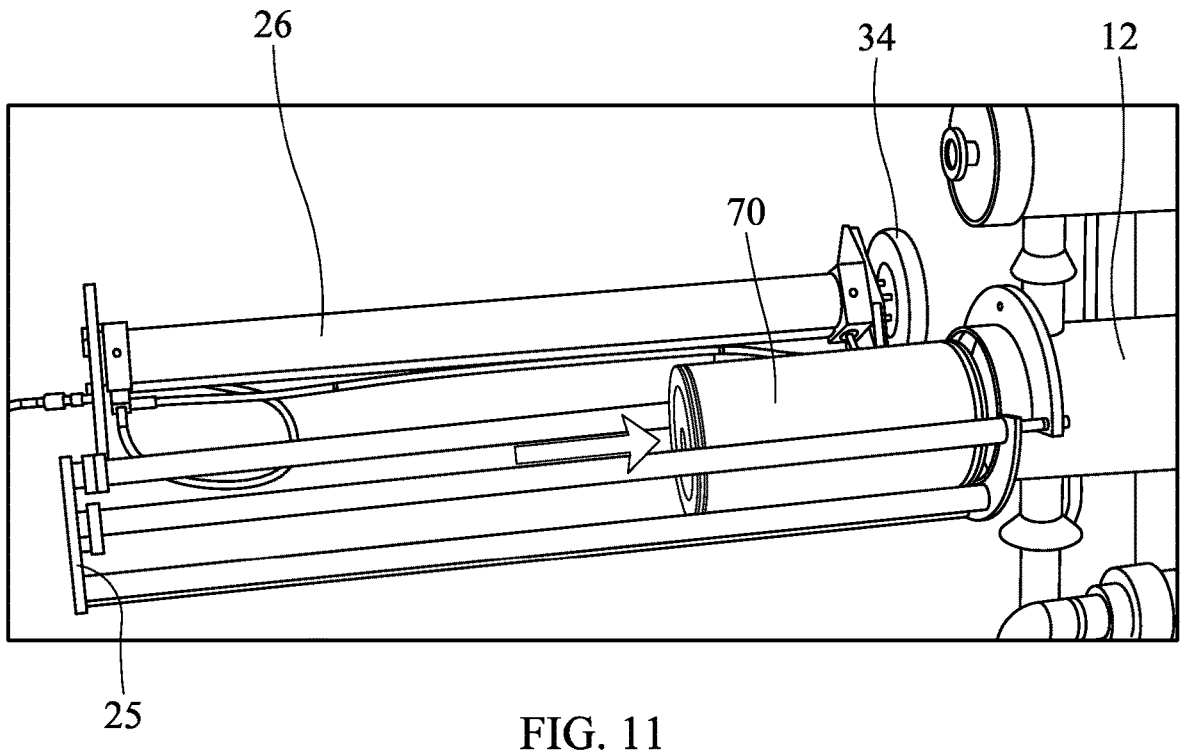
FIG. 11 illustrates a perspective view of a reverse osmosis filter ram apparatus having the reverse osmosis filter partially inserted into the steel reverse osmosis tube in an embodiment of the present invention.
Figure 12:
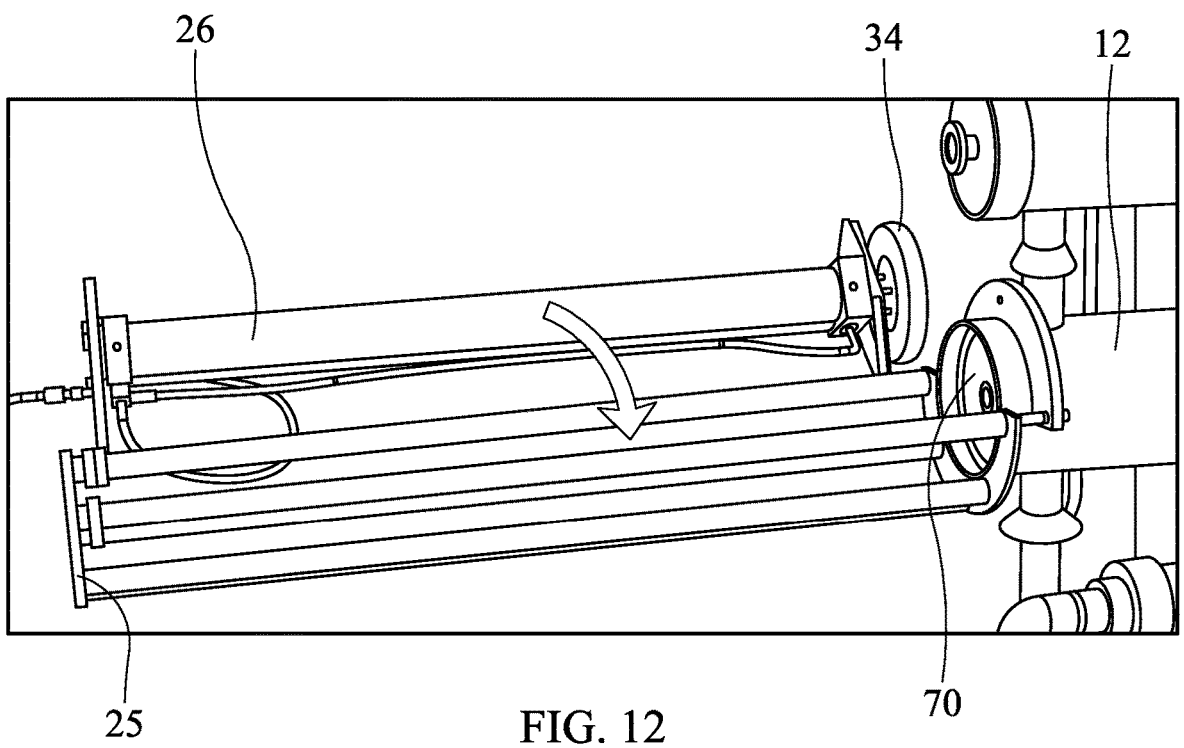
FIG. 12 illustrates a perspective view of a reverse osmosis filter ram apparatus having a reverse osmosis filter fully inserted into the steel reverse osmosis tube in an embodiment of the present invention.
Figure 13:
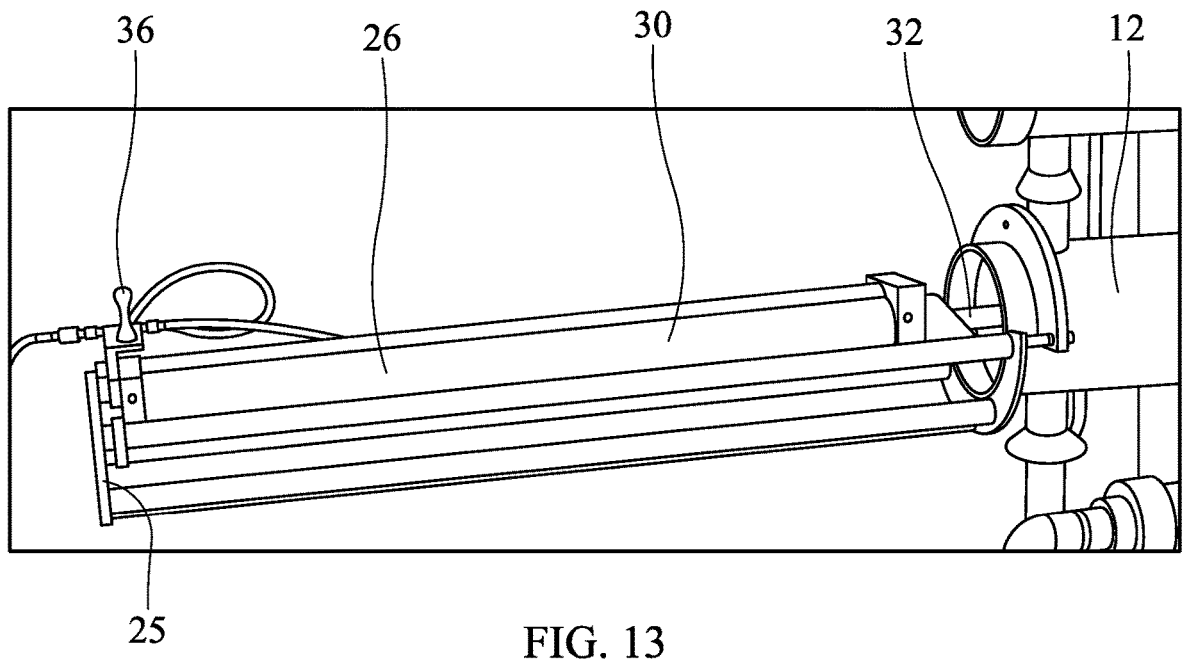
FIG. 13 illustrates a perspective view of a reverse osmosis filter ram apparatus wherein the ram is hydraulically extended to push the reverse osmosis filter further into the steel reverse osmosis tube in an embodiment of the present invention.

Specifically, in FIGS. 9-13, the plunger 26 may be rotated away from the base formed by the base rods 24 thereby clearing the area for a clean reverse osmosis filter 70, which may be placed onto the base rods 24 and aligned with the opening in the steel tube 12, as shown in FIG. 10. The clean reverse osmosis filter 70 may then be manually pushed into the steel tube 12, as shown in FIG. 11, so that an end thereof is just inside the opening of the steel tube 12, as shown in FIG. 12. Then, the plunger 26 may be rotated back toward the base formed by the base rods 24 so that the plunger head 34 aligns with the opening of the steel tube 12. The controller 36 may then be used to push the plunger rod 32 and plunger head 34 into the steel tube 12, thereby pushing the reverse osmosis filter into the steel tube 12. A plurality of clean reverse osmosis filters may therefore be added to the steel tube 12 in the same or similar manner. At the same time, any pushing spools 60 that may be within the steel tube 12 may be pushed out the opposite end thereof as the steel tube 12 becomes full of clean reverse osmosis filters.

Figure 14:
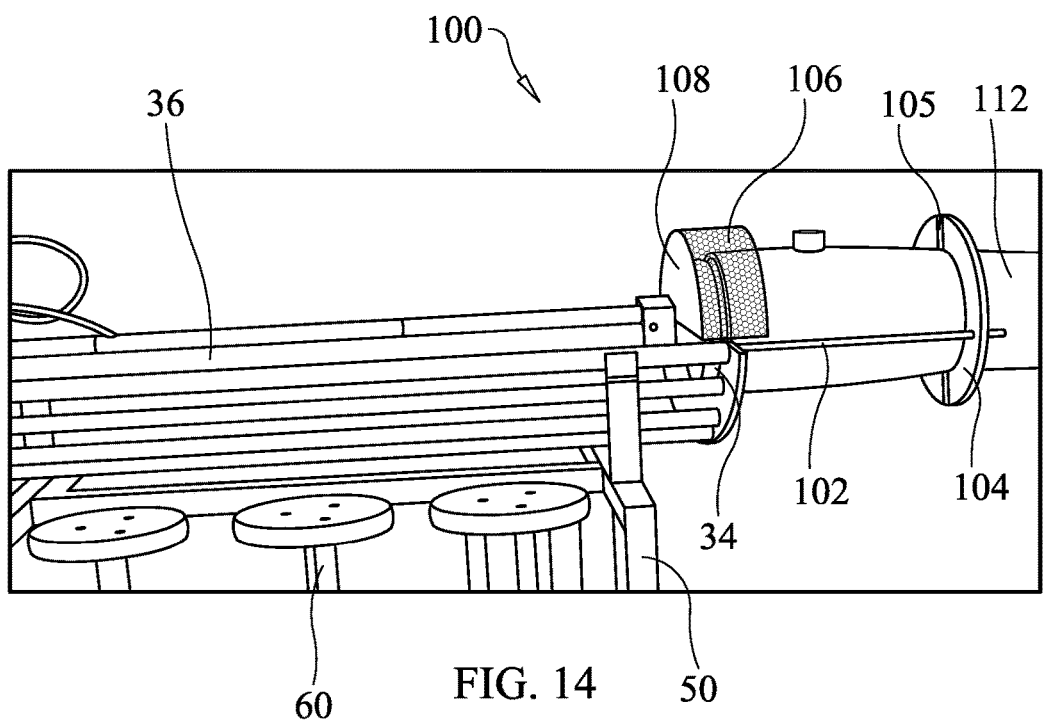
FIG. 14 illustrates a perspective view of a reverse osmosis filter ram apparatus connected to a fiberglass reverse osmosis tube in an alternate embodiment of the present invention.
Figure 15:
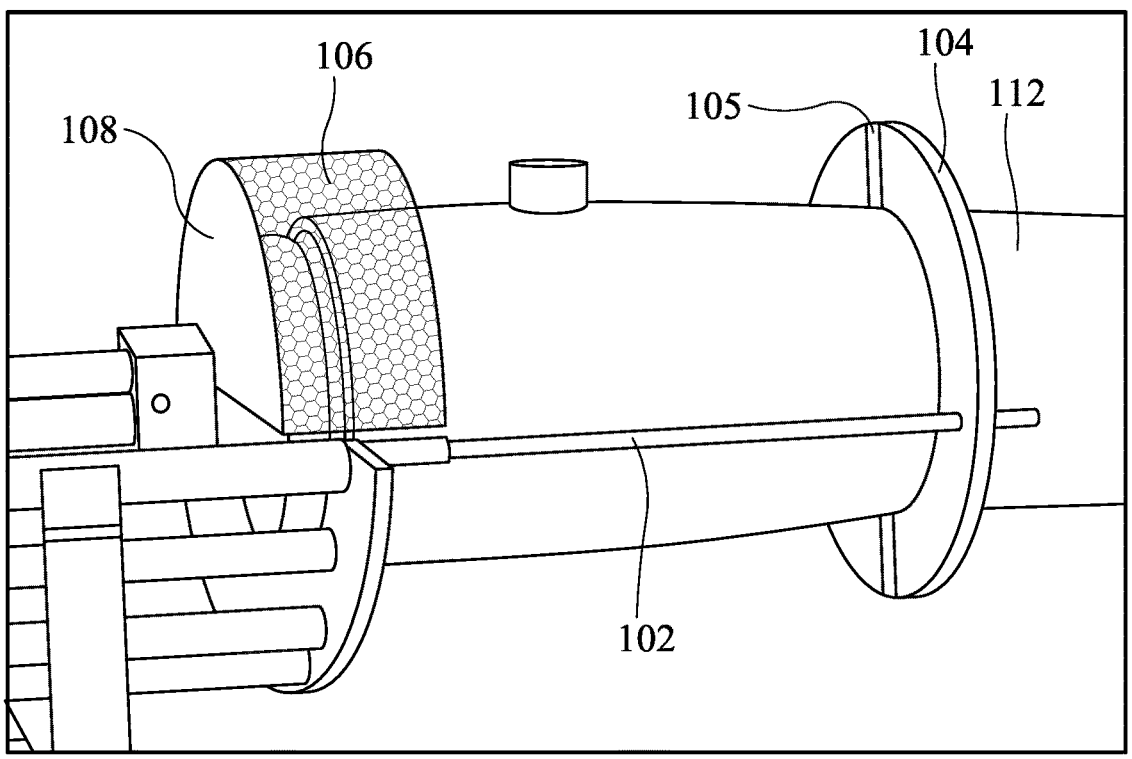
FIG. 15 illustrates a close-up perspective view of a reverse osmosis filter ram apparatus connected to a fiberglass reverse osmosis tube in the alternate embodiment of the present invention.

Referring now to FIGS. 14 and 15, an alternate embodiment of the present invention is illustrated. Specifically filter ram apparatus 100 is shown having many of the same parts as described above with respect to the filter ram apparatus 10, shown in FIGS. 1-13, except that instead of attaching to a steel tube, the filter ram apparatus 100 connects to a fiberglass reverse osmosis tube 112. The fiberglass reverse osmosis tube 112 also comprises a plurality of reverse osmosis filters therein, but because of the less sturdy nature of the fiberglass material, and because the fiberglass tube 112 has a flared end, it is difficult to utilize the same connection means as described above with respect to the filter ram apparatus 10 for the steel tube 12. As illustrated in FIG. 14, the second end plate 22 may comprise relatively long connector rods 102 that extend beyond the flare of the fiberglass tube and attach to a ring 104 having a shape and size sufficient to ring around the outside surface of the fiberglass tube 112 beyond the flare therein. Thus, the ring 104 may hold the apparatus 100 in place, aligning the plunger head 34 with the opening of the fiberglass tube 112.

As shown in FIG. 15, the plunger 26 may have a semi-disk-shaped end plate 108 having a mesh material 110 that may cover the plunger head 34 and the opening of the fiberglass tube 112 when in proper positioning. The end plate 108 and mesh material 110 may protect a user from material that may expel from the fiberglass tube 112 when the plunger head 34 is pushed into the fiberglass tube 112, either when adding pushing spools 60 or pushing through clean reverse osmosis filters, as described above.

In an alternate embodiment of the present invention, a reverse osmosis filter ram apparatus bracket 200 is illustrated. The bracket 200 may be attached to a fiberglass reverse osmosis tube 202 at an end thereof, allowing a reverse osmosis filter ram apparatus, such as the reverse osmosis filter ram apparatus 10, illustrated herein and described above, to attach thereto to align the plunger 26 with the tube 202. The fiberglass tube 202 may have a flare 206 at its end and the bracket 200 may utilize the flare to lock the bracket 200 onto the fiberglass tube.

Specifically, the bracket 200 may comprise a first ring 210 and a second ring 212 connected by one or more threaded rods 214, each of which may be attached to a first tab 216 on the first ring and a second tab 218 on the second ring 212. The first ring 210 may sit on the end 204 of the fiberglass tube 202 and the second ring 212 may sit behind the flare 206 of the fiberglass tube 202. To allow the second ring 212 to be placed on the fiberglass tube 202 behind the flare 206, the second ring 212 may have a hinge 213 on one end thereof and a bracket and bolt connection 215 on an opposite end thereof, holding the ring 212 together on the fiberglass tube 202.

Nuts 220, 222 may be utilized to tighten the threaded rods 214 on the first and second tabs 216, 218, respectively, and pull the second ring 212 toward the first ring 210. The second ring 212 may be tightened until the second ring 212 cannot travel closer to the first ring 210 due to the flare 206 of the fiberglass tube 202. Thus, the first ring 210 and the second ring 212 may be rigidly held on the end of the fiberglass tube 202.

Extending from the first ring 210 may be a short tube 230 extending past the end 204 of the fiberglass tube 202 and having roughly the same internal diameter as the internal diameter of the fiberglass tube 202. The short tube 230 may further have a clamp recession 232 that may provide a seat for the reverse osmosis filter ram apparatus 10 to be connected thereto. Specifically, the clamp plate or ring 42 of the reverse osmosis filter apparatus 10 may sit within the clamp recession 232 and be held therein.

Therefore, the short tube 230 may allow the reverse osmosis filter ram apparatus 10 to be clamped thereto in the same manner that the reverse osmosis filter ram apparatus 10 is clamped to the end of the steel reverse osmosis tube 12, described above. Therefore, with the bracket 200 clamped rigidly to the fiberglass tube and the reverse osmosis filter ram apparatus 10 clamped rigidly to the short tube 230 of the bracket 200, the reverse osmosis filter ram apparatus 10 may be utilized to push reverse osmosis filters therethrough.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A filter ram system for use in pushing reverse osmosis filters through a reverse osmosis tube comprising:
a filter ram apparatus comprising:
a base configured to hold a plunger, the plunger comprising a plunger rod and a plunger head on an end of the plunger rod, the plunger controlled via a linear actuator to extend the plunger rod and head from the plunger;
a controller for controlling the linear actuator to extend the plunger rod and plunger head from the plunger; and
a clamp on an end of the base; and
a fiberglass reverse osmosis tube attachment bracket comprising:
a first ring configured to sit on an end of a fiberglass reverse osmosis tube, the first ring having a bracket tube extending therefrom, the bracket tube extending beyond the end of the fiberglass reverse osmosis tube when sitting thereon and having an internal diameter roughly the same as an internal diameter of the fiberglass reverse osmosis tube;
a second ring configured to be attached around the fiberglass reverse osmosis tube behind a flare of the fiberglass reverse osmosis tube;
a first tab extending from the first ring;
a second tab extending from the second ring;
a threaded rod between the first tab and the second tab and connecting the second ring to the first ring,
wherein the clamp of the filter ram apparatus is configured to hold the base and the plunger of the filter ram apparatus onto the bracket tube of the bracket such that the plunger rod and plunger head are in alignment with an opening of the fiberglass reverse osmosis tube.

2. The filter ram system of claim 1 wherein the base comprises a plurality of base rods connected between a first end plate and a second end plate.

3. The filter ram system of claim 2 wherein the plurality of base rods is configured to form a base having a semi-cylindrical base area.

4. The filter ram system of claim 1 wherein the clamp comprises a first semi-circular ring element attached to the base and configured to engage a lower outside surface of the bracket tube.

5. The filter ram system of claim 4 wherein the clamp further comprises a second semi-circular ring element connected to the first semi-circular ring element and configured to engage an upper outside surface of the bracket tube.

6. The filter ram system of claim 5 wherein the second semi-circular ring element is attached to the first semi-circular ring element via at least one rod.

7. The filter ram system of claim 4 wherein the clamp further comprises a circular ring element connected to the first semi-circular ring element and configured to engage completely around a surface of bracket tube.

8. The filter ram system of claim 7 wherein the circular ring element is attached to the first semi-circular ring element via at least one rod.

9. The filter ram system of claim 1 wherein the plunger is rotatably connected to the base and comprises a first position and a second position, wherein the first position of the plunger is on or adjacent the base and the second position of the plunger is away from the base thereby forming an open space adjacent the space when the plunger is in the second position.

10. The filter ram system of claim 1 further comprising:
a pushing spool comprising a first disk end, a second disk end, and a rod disposed between the first disk end and the second disk end.

11. The filter ram system of claim 1 wherein the second ring of the bracket comprises a hinge for opening and closing the second ring on the fiberglass reverse osmosis tube.

12. The filter ram system of claim 1 further comprising:
a fiberglass reverse osmosis tube, wherein the bracket is attached to an open end of the fiberglass reverse osmosis tube.

13. A method of pushing a reverse osmosis filter through a reverse osmosis tube comprising the steps of:
providing the filter ram system of claim 1;
providing a fiberglass reverse osmosis tube;
clamping the bracket to an open end of the reverse osmosis tube;
clamping the reverse osmosis filter ram apparatus to the bracket tube; and
pushing a reverse osmosis filter through the reverse osmosis tube with the filter ram apparatus.

14. The method of claim 13 wherein the clamp comprises a first semi-circular ring element attached to the base and engages a lower outside surface of the bracket tube.

15. The method of claim 14 wherein the clamp further comprises a second semi-circular ring element connected to the first semi-circular ring element and engages an upper outside surface of the bracket tube.

16. The method of claim 15 wherein the second semi-circular ring element is attached to the first semi-circular ring element via at least one rod.

17. The method of claim 14 wherein the clamp further comprises a circular ring element connected to the first semi-circular ring element and configured to engage completely around a surface of the reverse osmosis tube.

18. The method of claim 17 wherein the circular ring element is attached to the first semi-circular ring element via at least one rod.

19. The method of claim 13 wherein the plunger is rotatably connected to the base and comprises a first position and a second position, wherein the first position of the plunger is on or adjacent the base and the second position of the plunger is away from the base thereby forming an open space adjacent the space when the plunger is in the second position, and comprising the steps of:
rotating the plunger from the first position to the second position;
placing the reverse osmosis filter into the open end of the fiberglass reverse osmosis tube;
rotating the plunger from the second position to the first position; and
pushing the reverse osmosis filter through the fiberglass reverse osmosis tube by extending the plunger rod and plunger head into the fiberglass reverse osmosis tube.

20. The method of claim 13 wherein the plunger is rotatably connected to the base and comprises a first position and a second position, wherein the first position of the plunger is on or adjacent the base and the second position of the plunger is away from the base thereby forming an open space adjacent the space when the plunger is in the second position, and comprising the steps of:
  providing a pushing spool comprising a first disk end, a second disk end, and a rod disposed between the first disk end and the second disk end;
  rotating the plunger from the first position to the second position; and
  pushing the spool into the fiberglass reverse osmosis tube by extending the plunger rod and plunger head into the fiberglass reverse osmosis tube.

* * * * *